United States Patent
Goodwin, III et al.

(10) Patent No.: US 6,859,786 B1
(45) Date of Patent: *Feb. 22, 2005

(54) SYSTEM AND METHOD OF DISPLAYING INFORMATION BY AN ELECTRONIC PRICE LABEL

(75) Inventors: John C. Goodwin, III, Suwanee, GA (US); Terry L. Zimmerman, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/274,410

(22) Filed: Mar. 23, 1999

(51) Int. Cl.$^7$ .............................................. G06F 17/60
(52) U.S. Cl. ............................. 705/20; 705/16; 705/21; 235/382; 235/375
(58) Field of Search .............................. 705/14, 20, 21, 705/16; 235/382, 383, 385, 375

(56) References Cited

U.S. PATENT DOCUMENTS

| | | | |
|---|---|---|---|
| 4,002,886 A | | 1/1977 | Sundelin ................. 235/61.7 R |
| 4,500,880 A | | 2/1985 | Gomersall et al. ..... 340/825.35 |
| 4,924,363 A | | 5/1990 | Kornelson .................. 362/125 |
| 5,172,314 A | | 12/1992 | Poland et al. ............... 364/401 |
| 5,448,226 A | | 9/1995 | Failing, Jr. et al. ..... 340/825.35 |
| 5,493,107 A | * | 2/1996 | Gupta et al. ................. 235/383 |
| 5,767,776 A | * | 6/1998 | Wong .......................... 340/632 |
| 5,797,131 A | * | 8/1998 | Goodwin, III et al. ....... 705/16 |
| 5,839,093 A | * | 11/1998 | Novosel et al. ............... 702/59 |
| 5,844,823 A | * | 12/1998 | Mishra ....................... 364/578 |

(List continued on next page.)

FOREIGN PATENT DOCUMENTS

| | | | | |
|---|---|---|---|---|
| EP | 0895174 A2 | * | 2/1999 | |
| EP | 0 895 174 A2 | * | 2/1999 | ........... G06F/17/60 |
| WO | WO00/20952 | * | 10/1998 | .................. 705/20 |

OTHER PUBLICATIONS

Regulatory News Service Aug. 13, 1999 Electronic Retailig Systems International.*

Evans James G., Low–cost two–way radio transceiver, Proceedings of the 1998 URSI International Syposium on Signals ISSSE '98 p. 301–303.*

*Primary Examiner*—Joseph A. Fischetti
(74) *Attorney, Agent, or Firm*—Paul W. Martin (57) ABSTRACT

A system and method of displaying information by an electronic price label which uses thresholds to minimize the number of messages to an electronic price label. The system includes a record for an item associated with the electronic price label which contains the thresholds. The thresholds divide the information into a number of ranges including a first range of information and a second range of information. The system further includes a computer for scheduling messages for transmission to the electronic price label, wherein the computer obtains first information associated with the first range and displayed by the electronic price label, obtains second information which is more recent than the first information, determines whether the first information equals the second information, and if the first information does not equal the second information, obtains the second range, determines whether the first information is within the second range, and sends a message to the electronic price label containing the second information and a command to display the second information instead of the first information if the first information is outside the second range.

5 Claims, 5 Drawing Sheets

U.S. PATENT DOCUMENTS

| | | | |
|---|---|---|---|
| 5,850,517 A | * 12/1998 | Verkler et al. | 395/200.32 |
| 5,873,069 A | * 2/1999 | Reuhl et al. | 705/20 |
| 5,918,212 A | * 6/1999 | Goodwin, III | 705/20 |
| 5,943,654 A | * 8/1999 | Goodwin, III et al. | 705/14 |
| 5,963,133 A | * 10/1999 | Monjo | 340/572.1 |
| 5,987,427 A | * 11/1999 | Goodwin, III et al. | 705/21 |
| 5,999,913 A | * 12/1999 | Goodwin, III | 705/20 |
| 6,009,538 A | * 12/1999 | Goodwin, III et al. | 714/25 |
| 6,012,040 A | * 1/2000 | Goodwin et al. | 705/20 |
| 6,021,395 A | * 2/2000 | Goodwin, III | 705/20 |
| 6,035,437 A | * 3/2000 | Ademec | 714/812 |
| 6,038,545 A | * 3/2000 | Mandeberg et al. | 705/15 |
| 6,044,358 A | * 3/2000 | Goodwin, III | 705/20 |
| 6,044,359 A | * 3/2000 | Goodwin, III | 705/20 |
| 6,047,263 A | * 4/2000 | Goodwin, III | 705/20 |
| 6,049,291 A | * 4/2000 | Kikinis | 340/825.44 |
| 6,076,071 A | * 6/2000 | Freeny | 705/26 |
| 6,173,268 B1 | * 1/2001 | Goodwin, III | 705/20 |
| 6,182,053 B1 | * 1/2001 | Rauber et al. | 705/28 |
| 6,184,834 B1 | * 2/2001 | Utsumi et al. | 343/702 |
| 6,211,773 B1 | * 4/2001 | Adamec et al. | 340/5.91 |
| 6,243,690 B1 | * 6/2001 | Ademec et al. | 705/20 |
| 6,317,724 B1 | * 11/2001 | Goodwin et al. | 705/20 |
| 6,397,199 B1 | * 5/2002 | Goodwin, III | 705/400 |

* cited by examiner

INVENTORY

| CONDITION | DISPLAY |
|---|---|
| out of stock | 0 |
| 1-10 | 10 |
| 11-50 | 50 |
| 51-100 | 100 |
| 101- | 999 |

FIG. 3B

DAILY SALES QUANTITY

| CONDITION | DISPLAY |
|---|---|
| 0 | 0 |
| 1-10 | 10 |
| 11-20 | 20 |
| 21-30 | 30 |
| 31-40 | 40 |
| 41-50 | 50 |
| 51- | 999 |

FIG. 3C

ON-ORDER QUANTITY

| CONDITION | DISPLAY |
|---|---|
| 0 | 0 |
| 1-25 | 25 |
| 25-50 | 50 |
| 51-75 | 75 |
| 76-100 | 100 |
| 101- | 999 |

FIG. 4

SYSTEM AND METHOD OF DISPLAYING INFORMATION BY AN ELECTRONIC PRICE LABEL

BACKGROUND OF THE INVENTION

The present invention relates to electronic price label (EPL) systems, and more specifically to a system and method of displaying information by an EPL.

EPL systems typically include a plurality of EPLs for merchandise items in a transaction establishment. EPLs typically display the prices of corresponding merchandise items on store shelves and are typically attached to a rail along the leading edge of the shelves. A transaction establishment may contain thousands of EPLs to display the prices of the merchandise items. The EPLs are coupled to a central server from where information about the EPLs is typically maintained in an EPL data file. Price information displayed by the EPLs is obtained from a price look-up (PLU) data file and stored within an EPL price change record.

EPLs may also display additional information, such as promotional information. The additional information may also include employee-directed information to assist in managing the transaction establishment, such as inventory information, sales dollars, on-order quantities, sales quantities (e.g., daily, weekly, monthly, quarterly, last year, this day). As the amount of additional information increases, and the frequency of change of displayed information increases, the number of messages transmitted to the EPLs increases. However, EPL system bandwidth is typically limited.

Therefore, it would be desirable to provide a system and method of displaying information by an EPL which reduces communication with the EPL.

SUMMARY OF THE INVENTION

In accordance with the teachings of the present invention, a system and method of displaying information by an EPL is provided.

The system includes a record for an item associated with the electronic price label which contains the thresholds. The thresholds divide the information into a number of ranges including a first range of information and a second range of information. The system further includes a computer for scheduling messages for transmission to the electronic price label, wherein the computer obtains first information associated with the first range and displayed by the electronic price label, obtains second information which is more recent than the first information, determines whether the first information equals the second information, and if the first information does not equal the second information, obtains the second range, determines whether the first information is within the second range, and sends a message to the electronic price label containing the second information and a command to display the second information instead of the first information if the first information is outside the second range.

A method of displaying information about a product by an electronic price label includes dividing the information into ranges, obtaining first information displayed by the electronic price label, obtaining second information which is more recent than the first information, determining whether the first information equals the second information, and if the first information does not equal the second information, obtaining a threshold for the second information, determining whether the first information is within the threshold, and sending a message to the electronic price label containing the second information and a command to display the second information instead of the first information if the first information is outside the threshold.

It is accordingly an object of the present invention to provide a system and method of displaying information by an EPL.

It is another object of the present invention to provide a system and method of displaying information by an EPL which uses thresholds to minimize the number of messages transmitted to the EPL.

It is another object of the present invention to provide a system and method of displaying information by an EPL which conserves system bandwidth.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
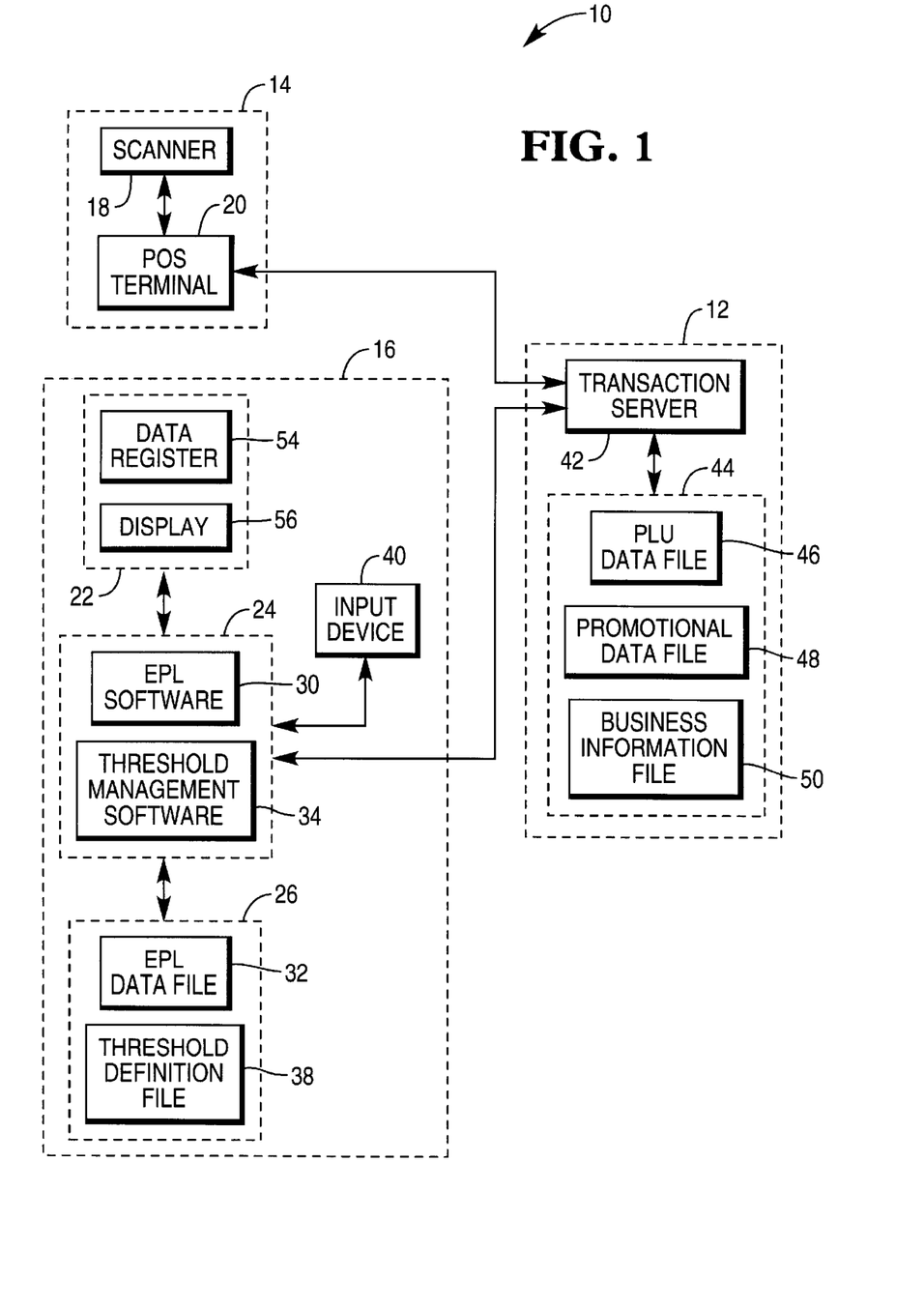
FIG. 1 is a block diagram of a transaction processing system.

Referring now to FIG. 1, transaction system 10 primarily includes host computer system 12, point-of-sale (POS) system 14, and EPL system 16. Here, components 12 and 14 are shown as separate components that are networked together, but they may also form a single component. Thus, host computer system 12 may be a POS terminal which doubles as a host computer for network of other POS terminals.

POS system 14 includes bar code reader 18 and terminal 20.

EPL system 16 primarily includes EPLs 22, host EPL terminal 24, and EPL storage medium 26.

EPLs 22 include a data register 54 and a display 56. Data registers 54 contain data, including price and other data, sent from EPL software 30. The data is typically displayed by displays 56.

Host EPL terminal 24 executes EPL software 30. To assist with execution of certain tasks performed by EPL software 30, EPL terminal 24 includes a built-in time keeping device, commonly referred to as a system clock, which is synchronized with current time, in order to automatically execute the tasks at their scheduled times.

EPL software 30 is responsible for scheduling and transmitting data to EPLs 22. EPL software 30 obtains prices from PLU data file 46 and may obtain additional data from PLU data file 46, EPL data file 32, or a separate file. For example, promotional data for merchandise items may be stored in a promotional data file 48 instead of PLU data file 46 or EPL data file 32. Employee-directed information to assist in managing the transaction establishment may be stored in a business information file 50 instead of PLU data file 46 or EPL data file 32.

EPL software 30 maintains EPL data file 32. EPL data file 32 contains EPL identification information and checksum information. A price checksum information is calculated from price information in PLU data file 46. EPL data file 32 also includes an entry for business information which is currently being displayed.

EPL terminal 24 also executes threshold management software 34. Threshold management software 34 provides an interface for operator management of thresholds for business information. These thresholds reduce the number of messages sent to EPLs 22 for updating business information displayed by EPLs 22. Threshold management software 34 stores thresholds for different types of business information in threshold definition file 38. An operator may add types of business information and edit the thresholds for the types of business information. Thresholds may vary by item type.

EPL software 30 reads threshold definition file 38 before sending a message containing business information.

EPL storage medium 26 stores EPL data file 32 and threshold definition file 38. EPL storage medium 26 is preferably a fixed disk drive.

Input device 40 is preferably a keyboard.

Host computer system 12 includes PLU storage medium 44 and transaction server 42.

Transaction server 42 handles price requests from POS terminal 20. POS terminal 20 sends item identification information to transaction server 42 and transaction server 42 returns the corresponding price from PLU data file 46.

PLU storage medium 44 stores PLU data file 46. PLU data file 46 is available for distribution to POS terminal 20. Provision may be made for direct access to PLU data file 46 by bar code reader 18.

Figure 2A:
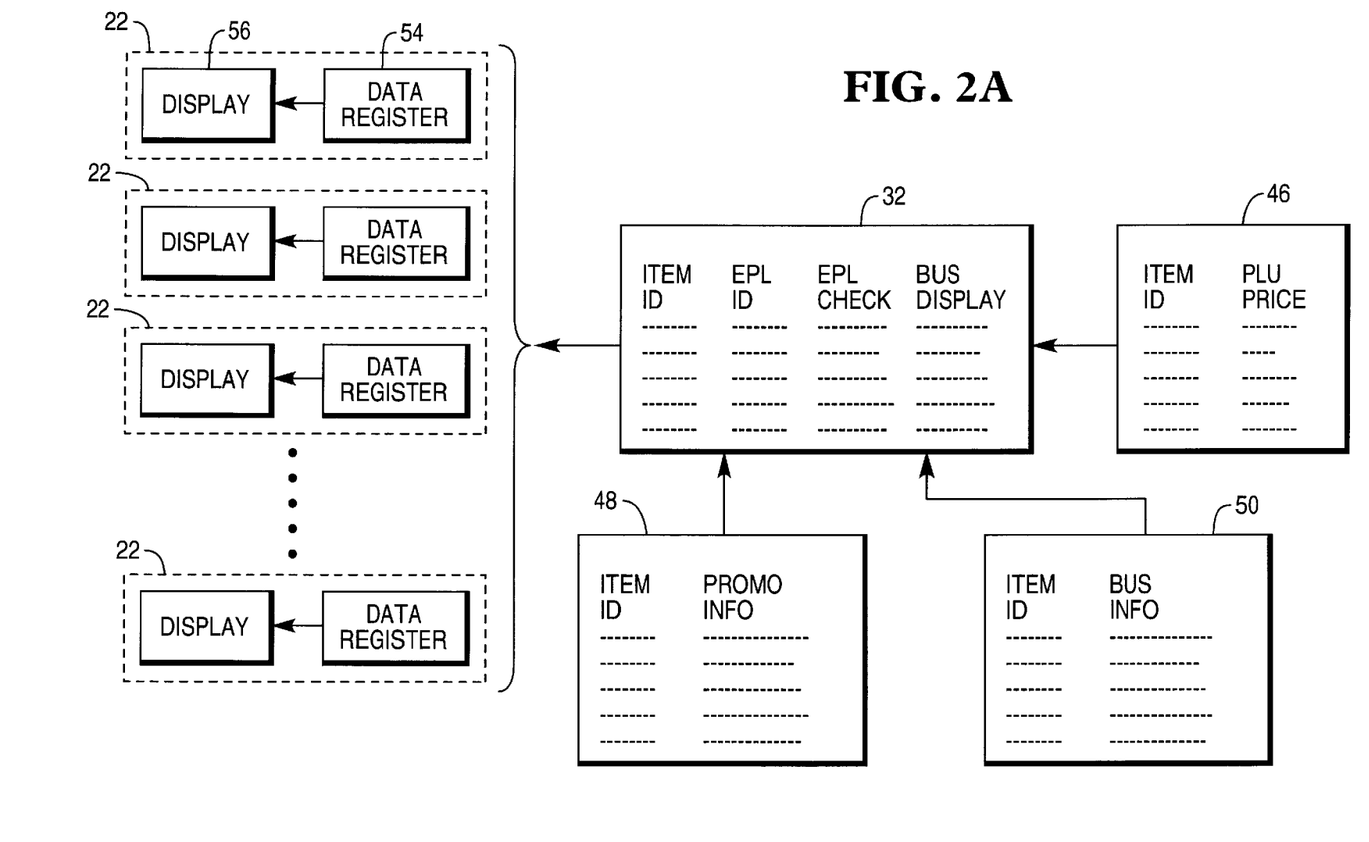
FIGS. 2A–B are diagrams showing data files used within a transaction establishment.
Figure 2B:
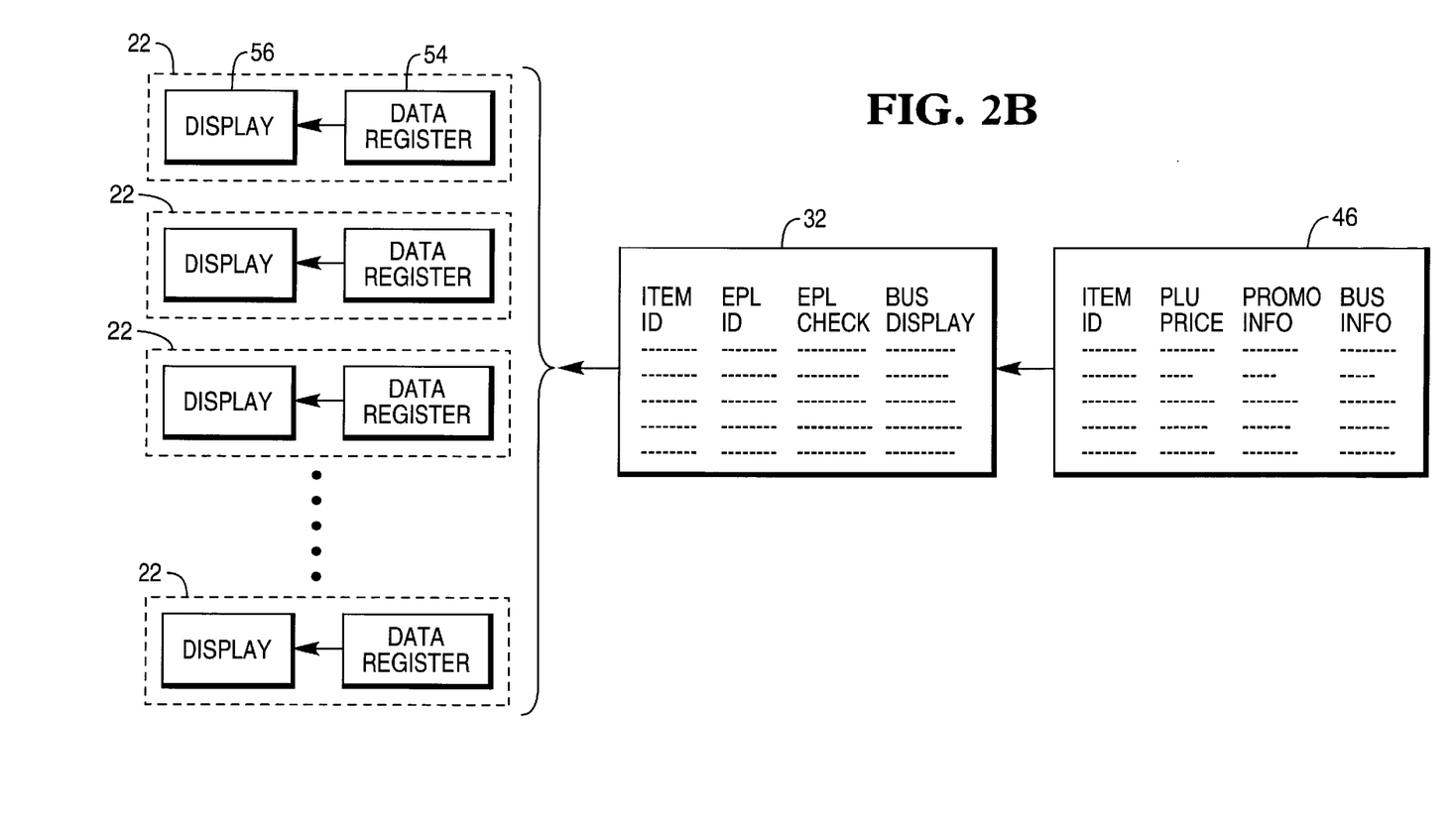

Turning now to FIGS. 2A–2B, EPL data file 32, PLU data file 46, promotional data file 48, and business information file 50 are shown in more detail. One or more of files 46, 48, and 50 may be combined into PLU data file 46 (FIG. 2B) or EPL data file 32.

EPL data file 32 includes a line entry for each EPL 22 in EPL system 16. Each line entry has an item identification entry (ITEM ID), an EPL identification entry (EPL ID), an EPL price checksum value entry (PRICE CHECK), and a business information entry (BUS DISPLAY).

Entry ITEM ID identifies a store item. Entry EPL ID identifies which EPL is assigned to the item. Entry PRICE CHECK is a checksum value of the price information displayed by display 56. Entry BUS DISPLAY contains currently displayed business information.

Promotional data file 48 may include a line entry for each item sold in the transaction establishment. Each line entry has at least an item identification entry (ITEM ID) and a promotional data entry (PROMO INFO).

Entry ITEM ID identifies a store item. Entry PROMO identifies promotional information to be displayed.

Business information file 50 may include a line entry for each item sold in the transaction establishment. Each line entry has at least an item identification entry (ITEM ID) and a business information entry (BUS INFO).

Business information file 50 may be a database, data warehouse, plan-o-gram database, in-store data file, and may come from an on-line source, a host system, or other source of business information. Business information in business information file 50 is available for distribution to EPL system 16.

Entry ITEM ID identifies a store item. Entry BUS INFO identifies the latest business information. Business information may include inventory level information, sales dollars, on-order quantities, sales quantities, and other quantitative data used to manage the store.

PLU data file 46 preferably includes a line entry for each item sold in the transaction establishment. Each line entry has at least an item identification entry (ITEM ID) and a PLU price entry (PLU PRICE).

Entry ITEM ID identifies a store item. Entry PLU PRICE identifies the price read by POS system 14 to determine the price of each item during scanning by bar code reader 18.

Figure 3A:
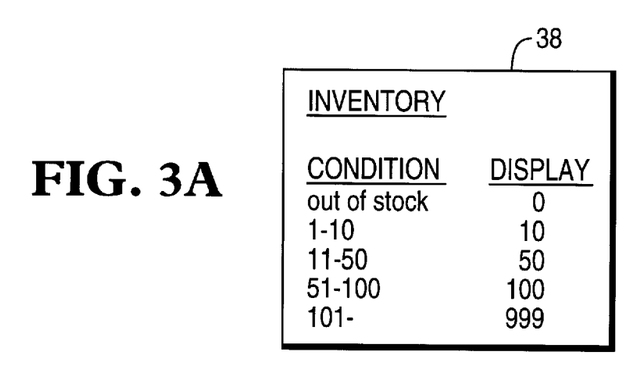
FIGS. 3A–C are diagrams of example records containing threshold information.
Figure 3B:
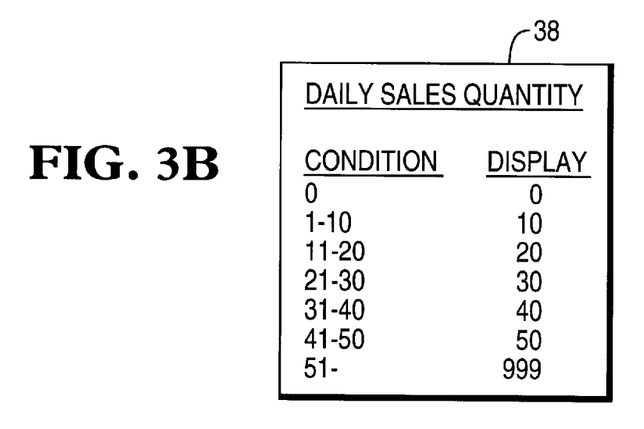
Figure 3C:
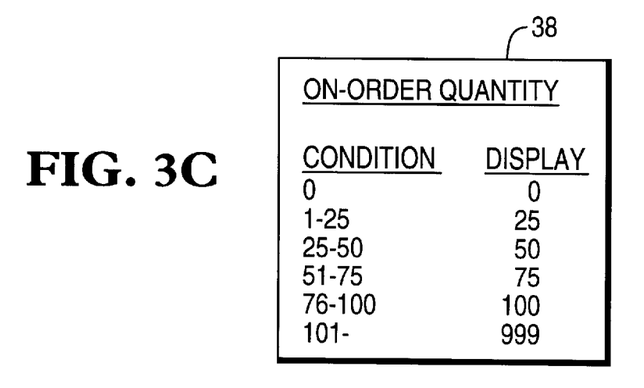

Turning now to FIGS. 3A–3C, example records within threshold definition file 38 are shown in detail. Threshold definition file 38 includes a record for each type of business information in business information data file 50. Each record contains threshold information.

FIG. 3A shows a record containing threshold information for inventory levels. Threshold ranges are listed under the heading "condition" and corresponding display information is listed under the heading "display". Thus, for example, when EPL software 30 is causing an EPL 22 to display inventory information, an inventory level of forty-five for an associated item would cause EPL software 30 to display fifty. EPL software 30 would not send a message to EPL 22 to change its display information until the inventory level were outside the eleven-to-fifty threshold range.

FIG. 3B shows a record containing daily sales quantity information and associated thresholds. EPL software 30 operates as illustrated above for FIG. 3A.

FIG. 3C shows a record containing on-order quantities and associated thresholds. EPL software 30 operates as illustrated above for FIG. 3A.

During normal operation, EPL software 30 periodically examines display data for each EPL for correctness.

In the case of price and promotional information, if current price or promotional information for an item is different from displayed information, then EPL software 30 sends a message to the associated EPL 22 to display the current price or promotional information.

In the case of business information, if current business information for an item is different from displayed information, then EPL software 30 compares the current business information with the displayed business information. If the current information exceeds threshold limits for the displayed information, then EPL software 30 sends a message to the associated EPL 22 to display the current business information. However, if the current information is within threshold limits, then EPL software 30 sends does not send a message, even though the business, information may have changed.

Priority for system bandwidth is given to price and promotional information, since this information is directed at customers. Less priority for bandwidth is given to business information, since business information is directed at store employees. By limiting messages containing business information, less system bandwidth is used up.

Figure 4:
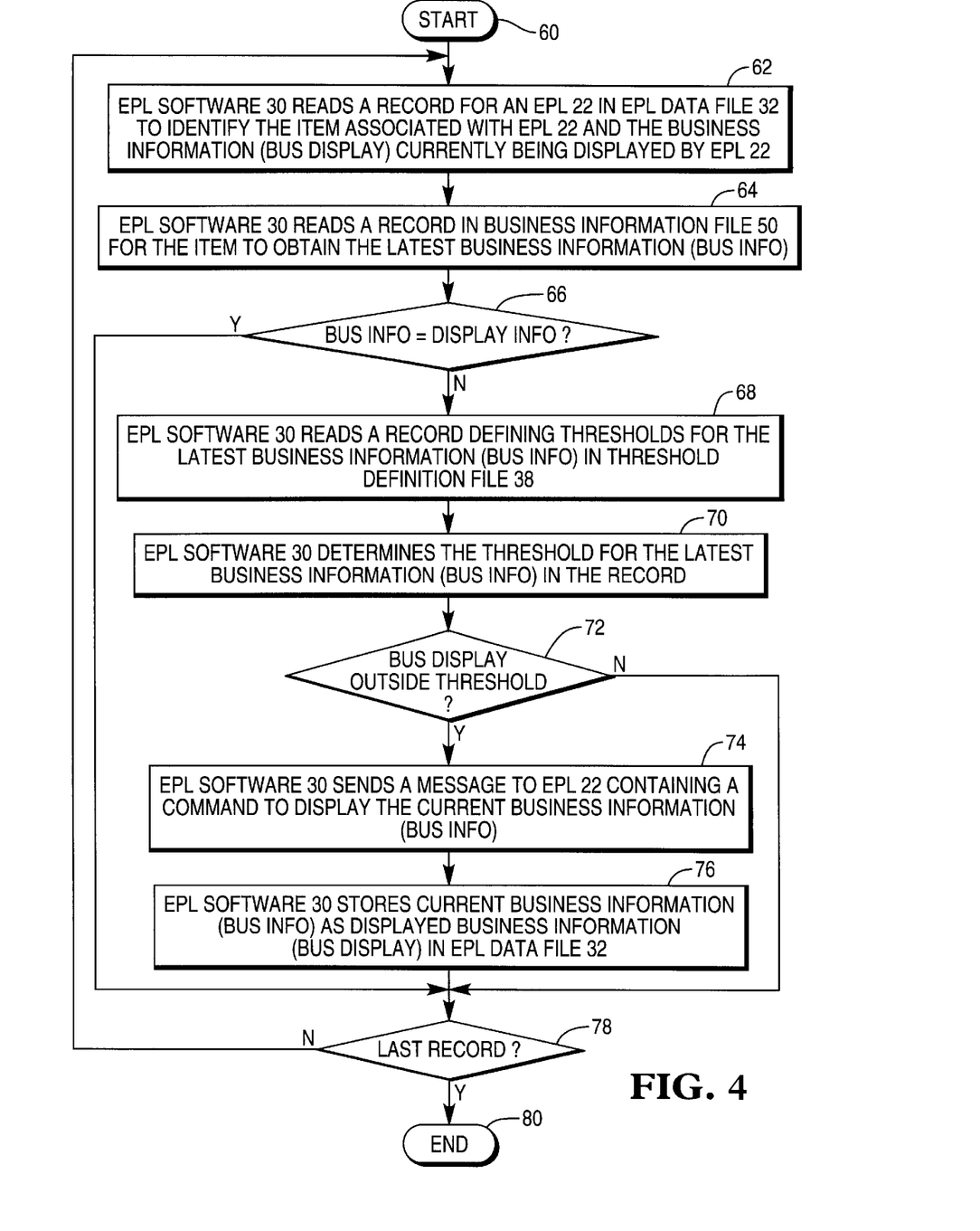
FIG. 4 is a flow diagram illustrating the method of the present invention.

Turning now to FIG. 4, the method of the present invention is illustrated in more detail beginning with START 60.

In step 62, EPL software 30 reads a record for an EPL 22 in EPL data file 32 to identify the item associated with EPL 22 and the business information (BUS DISPLAY) currently being displayed by EPL 22.

In step 64, EPL software 30 reads a record in business information file 50 for the item to obtain the latest business information (BUS INFO).

In step 66, EPL software 30 determines whether the currently displayed business information (BUS DISPLAY)

equals the latest business information (BUS INFO). If so, operation proceeds to steps 78 to read another record in EPL data file 32. If not, then operation proceeds to step 68.

In step 68, EPL software 30 reads a record defining thresholds for the latest business information (BUS INFO) in threshold definition file 38.

In step 70, EPL software 30 determines the threshold for the latest business information (BUS INFO) in the record. For example, if the type of displayed business information is inventory information and the latest business information (BUS INFO) is forty-five units, then the threshold would be the range eleven to fifty units (FIG. 3A).

In step 72, EPL software 30 determines whether the currently displayed business information (BUS DISPLAY) is outside the determined threshold. If so, operation proceeds to step 74. If not, operation proceeds to steps 78 to read another record in EPL data file 32.

From the earlier example, if the currently displayed business information (BUS DISPLAY) is ten units, then BUS DISPLAY is outside the threshold and steps 74 and 76 are implemented.

If BUS DISPLAY is thirty-five units, then BUS DISPLAY is inside the threshold and steps 74 and 76 are not implemented, even though BUS DISPLAY is not equal to the latest business information (BUS INFO). Thus, fewer messages are sent to EPL 22 to conserve bandwidth.

In step 74, EPL software 30 sends a message to EPL 22 containing a command to display the current business information (BUS INFO).

In step 76, EPL software 30 stores current business information (BUS INFO) as displayed business information (BUS DISPLAY) in EPL data file 32.

In step 78, EPL software 30 determines whether the record is the last record in EPL data file 32. If not, operation returns to step 62 to read another record. If so, operation ends at step 80.

Advantageously, the method of the present invention provides bandwidth savings for EPL systems that display business information. The amount of message and bandwidth savings is a function of management tolerance for incorrectly displayed business information. That is, the more error in displayed business information that managers and employees can live with, the fewer update messages need be sent.

Although the present invention has been described with particular reference to certain preferred embodiments thereof, variations and modifications of the present invention can be effected within the spirit and scope of the following claims. For example, instead of comparing the displayed information to the threshold of the current information, the method could compare the thresholds of the displayed and current information.

What is claimed is:

1. A method of displaying information about a product by an electronic price label which is driven by signals over a given bandwidth comprising:
   (a) dividing the information into ranges;
   (b) obtaining first information displayed by the electronic price label;
   (c) obtaining second information which is more recent than the first information;
   (d) determining whether the first information equals the second information; and
   (e) if the first information does not equal the second information, conserving the bandwidth by
   (e-1) obtaining a first range containing the second information;
   (e-2) determining whether the first information is within the first range;
   (e-3) if the first information is outside the first range, sending a message to the electronic price label containing the second information and a command to display the second information instead of the first information; and
   (e-4) if the first information is inside the first range, allowing the electronic price label to continue displaying the first information even though the first information is not so accurate as the second information.

2. The method as recited in claim 1, wherein the information is employee-directed item information.

3. The method as recited in claim 1, wherein (e-2) comprises:
   (e-2-A) obtaining a second range for the first information; and
   (e-2-B) determining whether the first range equals the second range.

4. A method of displaying information about a product other than price by an electronic price label which is driven by signals over a given bandwidth comprising:
   (a) dividing the information into ranges;
   (b) obtaining first information displayed by the electronic price label from a data record associated with the electronic price label;
   (c) obtaining second information which is more recent than the first information;
   (d) determining whether the first information equals the second information; and
   (e) if the first information does not equal the second information, conserving the bandwidth by obtaining a first range containing the second information, determining whether the first information is within the first range, and, if the first information is outside the first range, sending a message to the electronic price label containing the second information and a command to display the second information instead of the first information, and otherwise, if the first information is inside the first range, allowing the electronic price label to continue displaying the first information even though the first information is not so accurate as the second information.

5. A method of displaying inventory information about a product by an electronic price label which is driven by signals over a given bandwidth comprising:
   (a) dividing the inventory information into inventory ranges;
   (b) obtaining first inventory information displayed by the electronic price label from a data record associated with the electronic price label;
   (c) obtaining second inventory information which is more recent than the first inventory information;
   (d) determining whether the first inventory information equals the second inventory information; and
   (e) if the first inventory information does not equal the second inventory information, conserving the bandwidth by determining a first inventory range containing the second inventory information, determining whether the first inventory information is within the first inventory range, and, if the first inventory information is outside the first inventory range, sending a message to the electronic price label containing the second inventory information and a command to display the second inventory information instead of the first inventory information, and otherwise, if the first inventory information is inside the first range, allowing the electronic price label to continue displaying the first inventory information even though the first information is not so accurate as the second information.

* * * * *